(12) United States Patent
Singamsetty et al.

(10) Patent No.: US 10,129,700 B2
(45) Date of Patent: Nov. 13, 2018

(54) PREDICTION ALGORITHM FOR LOCATION ESTIMATION

(71) Applicant: WiSilica Inc., Laguna Hills, CA (US)

(72) Inventors: Suresh Kumar Singamsetty, Aliso Viejo, CA (US); Dennis Ching Chung Kwan, San Diego, CA (US)

(73) Assignee: WiSilica Inc., Laguna Hills, CA (US)

( * ) Notice: Subject to any disclaimer, the term of this patent is extended or adjusted under 35 U.S.C. 154(b) by 0 days.

(21) Appl. No.: 15/813,149

(22) Filed: Nov. 14, 2017

(65) Prior Publication Data

US 2018/0213356 A1    Jul. 26, 2018

Related U.S. Application Data

(60) Provisional application No. 62/421,656, filed on Nov. 14, 2016.

(51) Int. Cl.
*H04W 24/00*    (2009.01)
*H04W 4/02*    (2018.01)
*H04B 17/318*    (2015.01)
*H04W 84/18*    (2009.01)

(52) U.S. Cl.
CPC .......... *H04W 4/023* (2013.01); *H04B 17/318* (2015.01); *H04W 84/18* (2013.01)

(58) Field of Classification Search
None
See application file for complete search history.

(56) References Cited

U.S. PATENT DOCUMENTS

| | | | |
|---|---|---|---|
| 2005/0136845 A1* | 6/2005 | Masuoka | G01S 5/0294 455/67.14 |
| 2017/0323555 A1* | 11/2017 | Embree | G08B 25/12 |
| 2017/0330446 A1* | 11/2017 | Thurlow | H04W 4/90 |

* cited by examiner

*Primary Examiner* — Erika Washington
(74) *Attorney, Agent, or Firm* — FSP LLC (57) ABSTRACT

A system for estimating the location of a node in a mesh network and predicting future location of the same. Historical RSSI of nodes in a mesh network may be used to determine relative location amongst other nodes. The system may employ statistical approaches to predict future node locations.

14 Claims, 12 Drawing Sheets

FIG. 12

PREDICTION ALGORITHM FOR LOCATION ESTIMATION

CROSS-REFERENCE TO RELATED APPLICATIONS

This present disclosure claims the benefit of U.S. Provisional Application Ser. No. 62/421,656, filed on Nov. 14, 2016.

BACKGROUND

Location estimation of an emitting device (e.g., mobile device, beacons, tags, etc.,) utilizes standardized triangulation methods to determine location of the emitting device. These methods utilize relative signal strength indicator values detected from the emitting device at a listener to correlate the distance of the emitting device from the listener. Since the relative signal strength may have a lot of variation based on factors (e.g., orientation of the emitting device, environmental obstructions, etc.,) that may affect the strength of the emitted signal, these existing systems are utilizing a flawed model to estimate distance. As emitting devices begin to rely more on real time locations services to determine to location of the device, a more robust method of estimating and predicting device location is needed.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

Various terminology is utilized herein and should be interpreted as conventionally understood in the relevant art(s), unless expressly defined below.

"Circuitry" in this context refers to electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes or devices described herein, or a microprocessor configured by a computer program which at least partially carries out processes or devices described herein), circuitry forming a memory device (e.g., forms of random access memory), or circuitry forming a communications device (e.g., a modem, communications switch, or optical-electrical equipment).

"Firmware" in this context refers to software logic embodied as processor-executable instructions stored in read-only memories or media.

"Hardware" in this context refers to logic embodied as analog or digital circuitry.

"Logic" in this context refers to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

"Programmable device" in this context refers to an integrated circuit designed to be configured and/or reconfigured after manufacturing. The term "programmable processor" is another name for a programmable device herein. Programmable devices may include programmable processors, such as field programmable gate arrays (FPGAs), configurable hardware logic (CHL), and/or any other type programmable devices. Configuration of the programmable device is generally specified using a computer code or data such as a hardware description language (HDL), such as for example Verilog, VHDL, or the like. A programmable device may include an array of programmable logic blocks and a hierarchy of reconfigurable interconnects that allow the programmable logic blocks to be coupled to each other according to the descriptions in the HDL code. Each of the programmable logic blocks may be configured to perform complex combinational functions, or merely simple logic gates, such as AND, and XOR logic blocks. In most FPGAs, logic blocks also include memory elements, which may be simple latches, flip-flops, hereinafter also referred to as "flops," or more complex blocks of memory. Depending on the length of the interconnections between different logic blocks, signals may arrive at input terminals of the logic blocks at different times.

"Software" in this context refers to logic implemented as processor-executable instructions in a machine memory (e.g. read/write volatile or nonvolatile memory or media).

"6LowPAN" in this context refers to an acronym of IPv6 (Internet Protocol Version 6) over Low power Wireless Personal Area Networks. It is a wireless standard for low-power radio communication applications that need wireless internet connectivity at lower data rates for devices with limited form factor. 6LoWPAN utilizes the RFC6282 standard for header compression and fragmentation. This protocol is used over a variety of networking media including Bluetooth Smart (2.4 GHz) or ZigBee or low-power RF (sub-1 GHz) and as such, the data rates and range may differ based on what networking media is used.

"Bluetooth Low-Energy (BLE)—or Bluetooth Smart" in this context refers to a wireless personal area network technology aimed at reduced power consumption and cost while maintaining a similar communication range as traditional Bluetooth. Like traditional Bluetooth, the frequency utilized is 2.4 GHz (ISM-Industrial, Scientific and Medical), the maximum range is generally 50-150 m with data rates up to 1 Mbps.

"Cellular" in this context refers to a communication network where the last link is wireless. The network is distributed over land areas called cells and utilizes one of the following standards GSM/GPRS/EDGE (2G), UMTS/HSPA (3G), LTE (4G). Frequencies are generally one of 900/1800/1900/2100 MHz. Ranges are 35 km max for GSM; 200 km max for HSPA and typical data download rates are: 35-170 kps (GPRS), 120-384 kbps (EDGE), 384 Kbps-2 Mbps (UMTS), 600 kbps-10 Mbps (HSPA), 3-10 Mbps (LTE).

"LoRaWAN" in this context refers to Low Power Wide Area Network, a media access control (MAC) protocol for wide area networks for low-cost, low-power, mobile, and secure bi-directional communication for large networks of up to millions of devices. LoRaWAN is employed on various frequencies, with a range of approximately 2-5 km (urban environment) to 15 km (suburban environment) and data rates of 0.3-50 kbps.

"NFC" in this context refers to "Near Field Communication" and is a subset of RFID (Radio Frequency Identifier) technology. NFC is standardized in ECMA-340 and ISO/IEC 18092. It employs electromagnetic induction between two loop antennae when NFC devices are within range (10 cm). NFC utilizes the frequency of 13.56 MHz (ISM). Data rates range from 106 to 424 kbit/s.

"SigFox" in this context refers to a cellular-style system that enables remote devices to connect using ultra-narrow band (UNB) technology and binary phase-shift keying (BPSK) to encode data. Utilizes the 900 MHz frequency and has a range of 30-50 km in rural environments and 3-10 km in urban environments with data rates from 10-1000 bps.

"Thread" in this context refers to a wireless mesh network standard that utilizes IEEE802.15.4 for the MAC (Media Access Control) and Physical layers, IETF IPv6 and 6LoW-PAN (IVP6). Thread operates at 250 kbps in the 2.4 GHz band. The IEEE 802.15.4-2006 version of the specification is used for the Thread stack.

"Weightless" in this context refers to an open machine to machine protocol which spans the physical and mac layers. Operating frequency: 200 MHz to 1 GHz (900 MHz (ISM) 470-790 MHz (White Space)) Fractional bandwidth of spectrum band: <8% (for continuous tuning). Range up to 10 km and data Rates which range from a few bps up to 100 kbps "WiFi" in this context refers to a wireless network standard based on 802.11 family which consists of a series of half-duplex over-the-air modulation techniques that use the same basic protocol. Frequencies utilized include 2.4 GHz and 5 GHz bands with a range of approximately 50 m. Data rate of 600 Mbps maximum, but 150-200 Mbps is more typical, depending on channel frequency used and number of antennas (latest 802.11-ac standard should offer 500 Mbps to 1 Gbps).

"Z-Wave" in this context refers to a wireless standard for reliable, low-latency transmission of small data packets. The Z-Wave utilizes the Z-Wave Alliance ZAD12837/ITU-T G.9959 standards and operated over the 900 MHz frequency in the US (Part 15 unlicensed ISM) and is modulated by Manchester channel encoding. Z-Wave has a range of 30 m and data rates up to 100 kbit/s.

"ZigBee" in this context refers to a wireless networking standard for low power, low data rate, and lost cost applications. The Zigbee protocol builds upon the Institute of Electrical and Electronics Engineers (IEEE) 802.15.4 standard which defines a short range, low power, low data rate wireless interface for small devices that have constrained power, CPU, and memory resources. Zigbee operates over the 2.4 GHz frequency, with a range of 10-100 m and data rates of 250 kbps.

Disclosed herein are embodiments of an improved system and process for device location estimation and prediction. The system and process embodiments are disclosed in the context of mesh networks, but are not so limited. Various wireless technologies may be utilized to implement the system, including those listed above.

A mesh network is a type of machine communication system in which each client node (sender and receiver of data messages) of the network also relays data for the network. All client nodes cooperate in the distribution of data in the network. Mesh networks may in some cases also include designated router and gateway nodes (e.g., nodes that connect to an external network such as the Internet) that are or are not also client nodes. The nodes are often laptops, cell phones, or other wireless devices. The coverage area of the nodes working together as a mesh network is sometimes called a mesh cloud.

Mesh networks can relay messages using either a flooding technique or a routing technique. Flooding is a routing algorithm in which every incoming packet, unless addressed to the receiving node itself, is forwarded through every outgoing link of the receiving node, except the one it arrived on. With routing, the message is propagated through the network by hopping from node to node until it reaches its destination. To ensure that all its paths remain available, a mesh network may allow for continuous connections and may reconfigure itself around broken paths. In mesh networks there is often more than one path between a source and a destination node in the network. A mobile ad hoc network (MANET) is usually a type of mesh network. MANETs also allow the client nodes to be mobile.

A wireless mesh network (WMN) is a mesh network of radio nodes. Wireless mesh networks can self-form and self-heal and can be implemented with various wireless technologies and need not be restricted to any one technology or protocol. Each device in a mobile wireless mesh network is free to move, and will therefore change its routing links among the mesh nodes accordingly.

Mesh networks may be decentralized (with no central server) or centrally managed (with a central server). Both types may be reliable and resilient, as each node needs only transmit as far as the next node. Nodes act as routers to transmit data from nearby nodes to peers that are too far away to reach in a single hop, resulting in a network that can span larger distances. The topology of a mesh network is also reliable, as each node is connected to several other nodes. If one node drops out of the network, due to hardware failure or moving out of wireless range, its neighbors can quickly identify alternate routes using a routing protocol.

Figure 1:
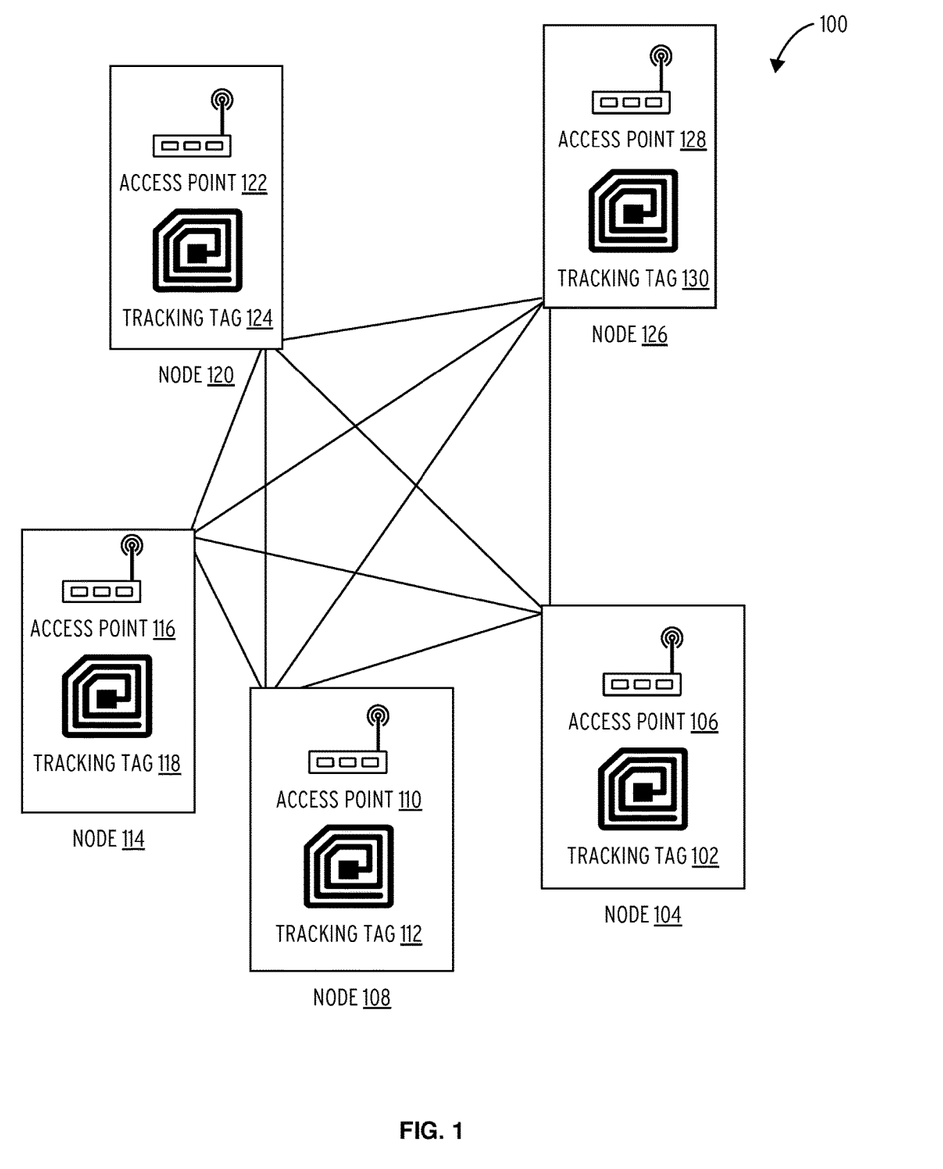
FIG. 1 illustrates an embodiment of a system 100 for integrating building automation with location awareness utilizing wireless mesh technology.
Figure 2:
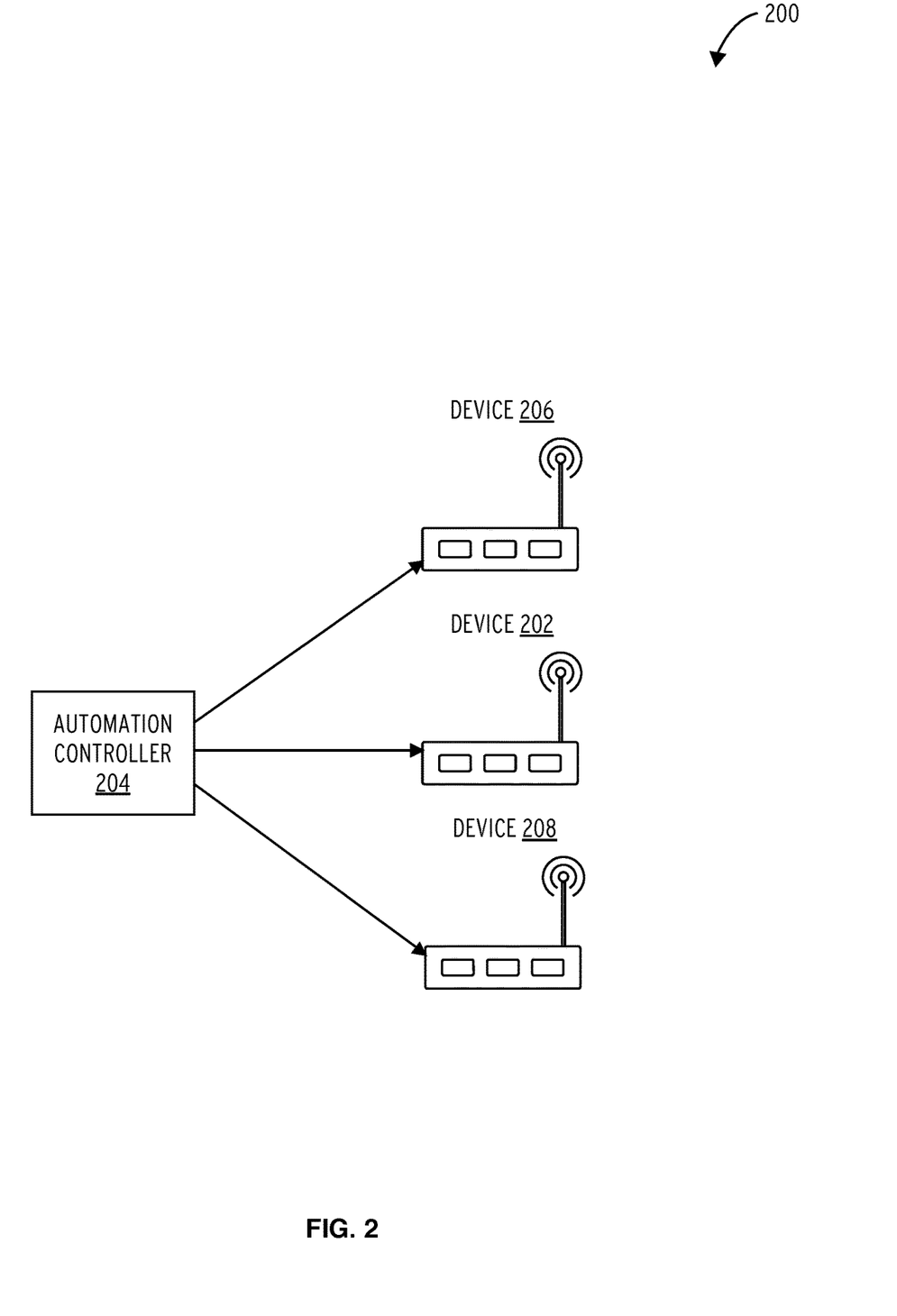
FIG. 2 illustrates an embodiment of a system 200 for integrating building automation with location awareness utilizing wireless mesh technology.
Figure 3:
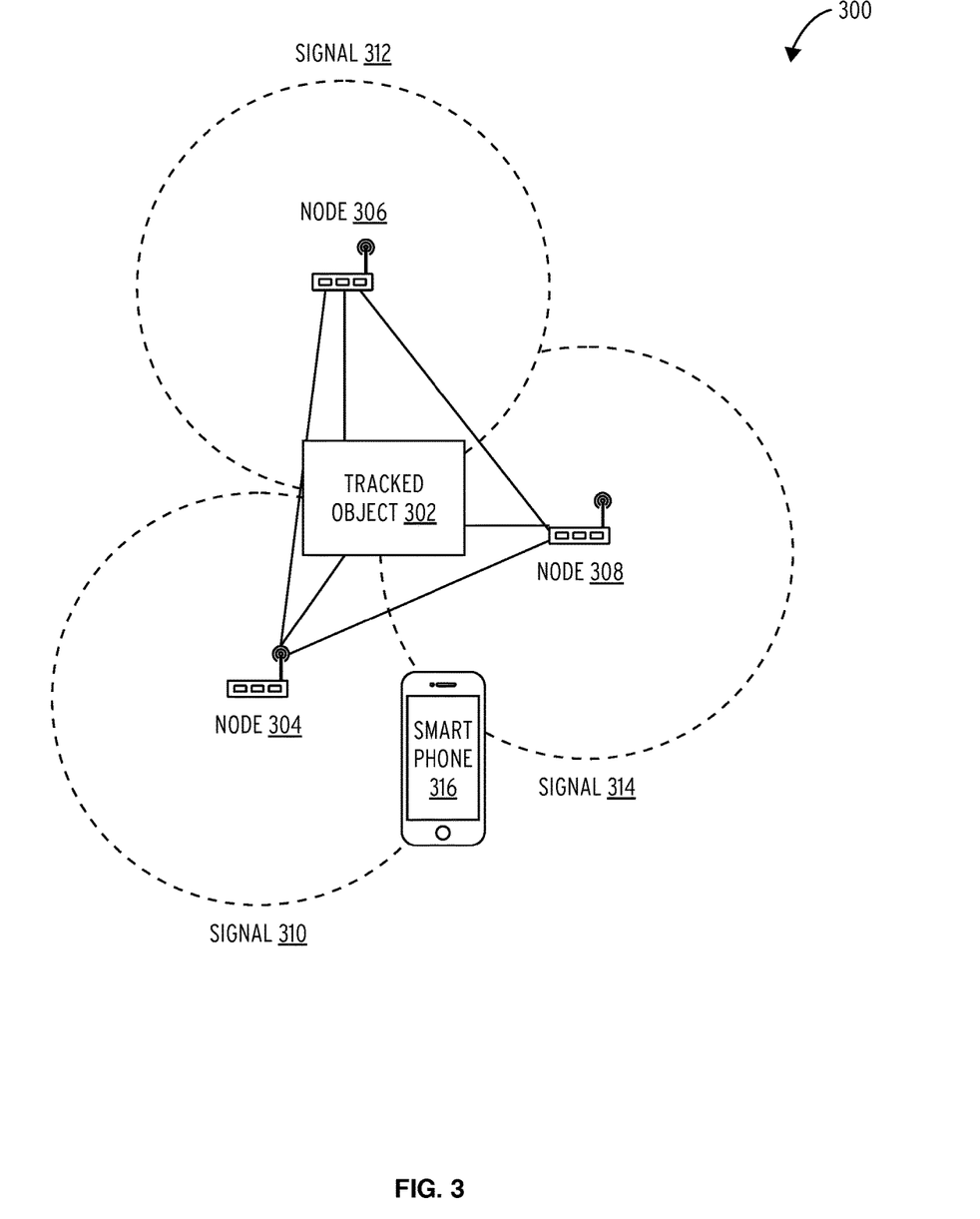
FIG. 3 illustrates an aspect of a system 300 for integrating building automation with location awareness utilizing wireless mesh technology.

FIGS. 1-3 illustrate various mesh network environments for implementing the disclosed embodiments.

FIG. 1 illustrates an embodiment of a system 100 (mesh network) for integrating building automation with location awareness utilizing wireless mesh technology. The system 100 comprises the node 104, the node 114, the node 108, the node 120, and the node 126. The node 120 comprises the tracking tag 124, and the access point 122. The node 126 comprises the access point 128 and the tracking tag 130. The node 104 comprises the tracking tag 102 and the access point 106. The node 108 comprises the access point 110 and the tracking tag 112. The node 114 comprises the access point 116 and the tracking tag 118.

FIG. 2 illustrates an embodiment of a system 200 for integrating building automation with location awareness utilizing wireless mesh technology, which includes an automation controller 204 and various devices (e.g., a device 202, a device 206, and a device 208). The automation controller 204 communicates with and manages the various devices, as further elaborated herein.

FIG. 3 illustrates an embodiment of a system 300 for integrating building automation with location awareness utilizing wireless mesh technology. The system 300 comprises the node 306, the tracked object 302, the node 308, the node 304, the signal 312, the signal 314, the signal 310, and the smart phone 316.

Figure 4:
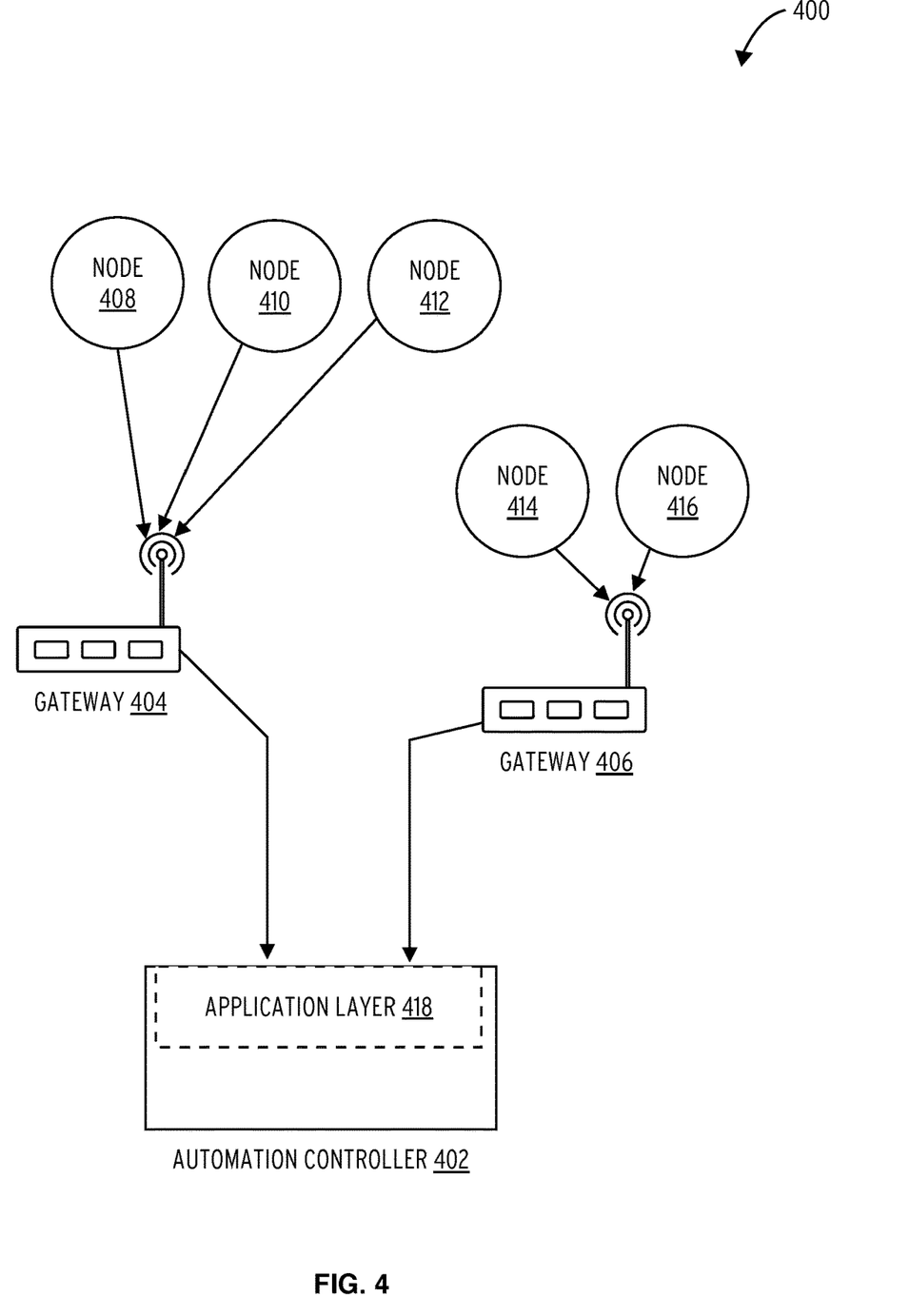
FIG. 4 illustrates an embodiment of a system 400 for integrating building automation with location awareness utilizing wireless mesh technology.

FIG. 4 illustrates an embodiment of a system 400 for integrating building automation with location awareness utilizing wireless mesh technology. The system 400 comprises the node 408, the node 410, the node 412, the node 414, the node 416, the gateway 404, the gateway 406, the application layer 418 and the automation controller 402.

The automation controller 402 maybe operate as a location estimation and prediction controller for estimating location of a transmitting device, as further described herein.

Figure 5:
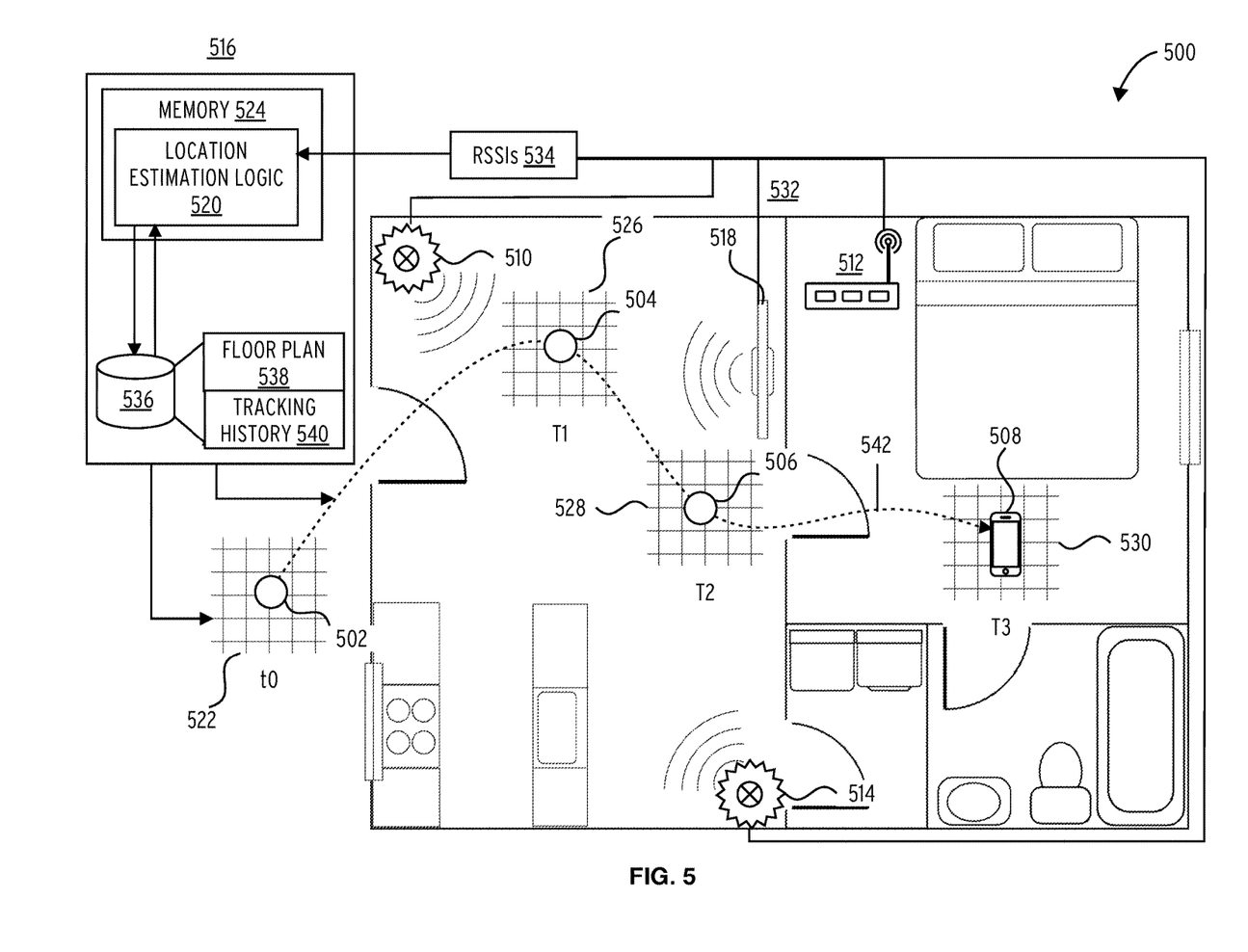
FIG. 5 illustrates an embodiment of a system environment 500 for operating a system for location estimation and prediction in a mesh network.

Referencing FIG. 5, a system environment 500 for operating a system for location estimation and prediction in a mesh network comprises a location estimation and prediction controller 516 and a mesh network 532. Points 502, 504, and 506 represent locations in the given environment. The location estimation and prediction controller 516 comprises memory 524 and a controlled memory data structure 536. The memory 524 comprises location estimation logic 520. The controlled memory data structure 536 comprises floor plan 538 and tracking history 540. The mesh network comprises node listener 510, node listener 518, node listener 512, node listener 514, and a transmitting device 508. The node listener 510, the node listener 512, the node listener 514, and the node listener 518, detects the transmitting device 508 moving through the mesh network 532, each generating RSSIs 534 at the various time points. The location estimation logic 520 processes the RSSIs 534 to generate location variance distribution map 522 at an initial time point t0, location variance distribution map 526 at t1, location variance distribution map 528 at t2, and location variance distribution map 530 at t3. The location estimation logic 520 utilizes the floor plan 538 and the tracking history 540 stored in the controlled memory data structure 536 to determine an estimated device path 542 for the transmitting device 508.

Figure 8:
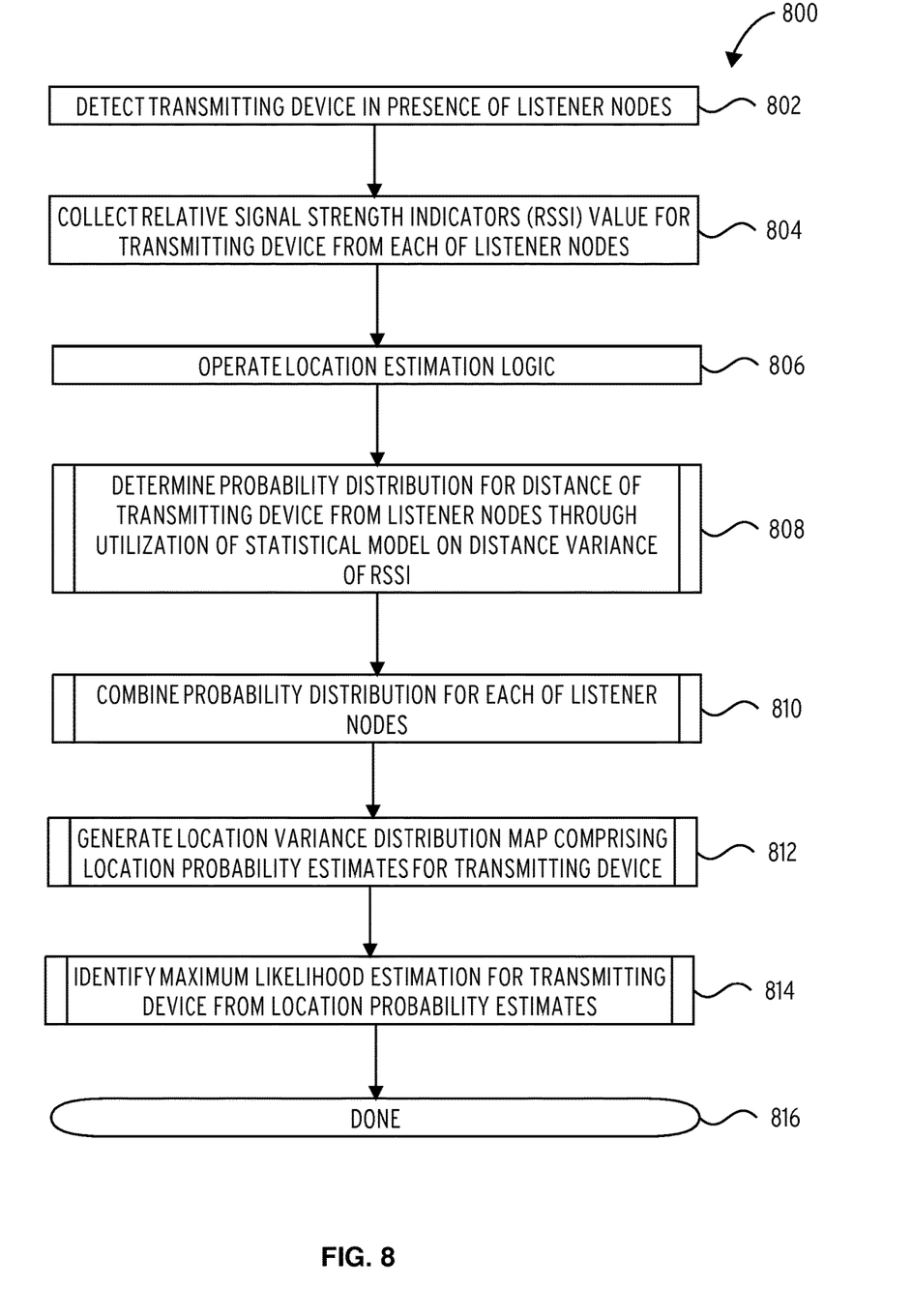
FIG. 8 illustrates an embodiment of a process 800 for estimating location of a transmitting device through the utilization of an emitting device.
Figure 10:
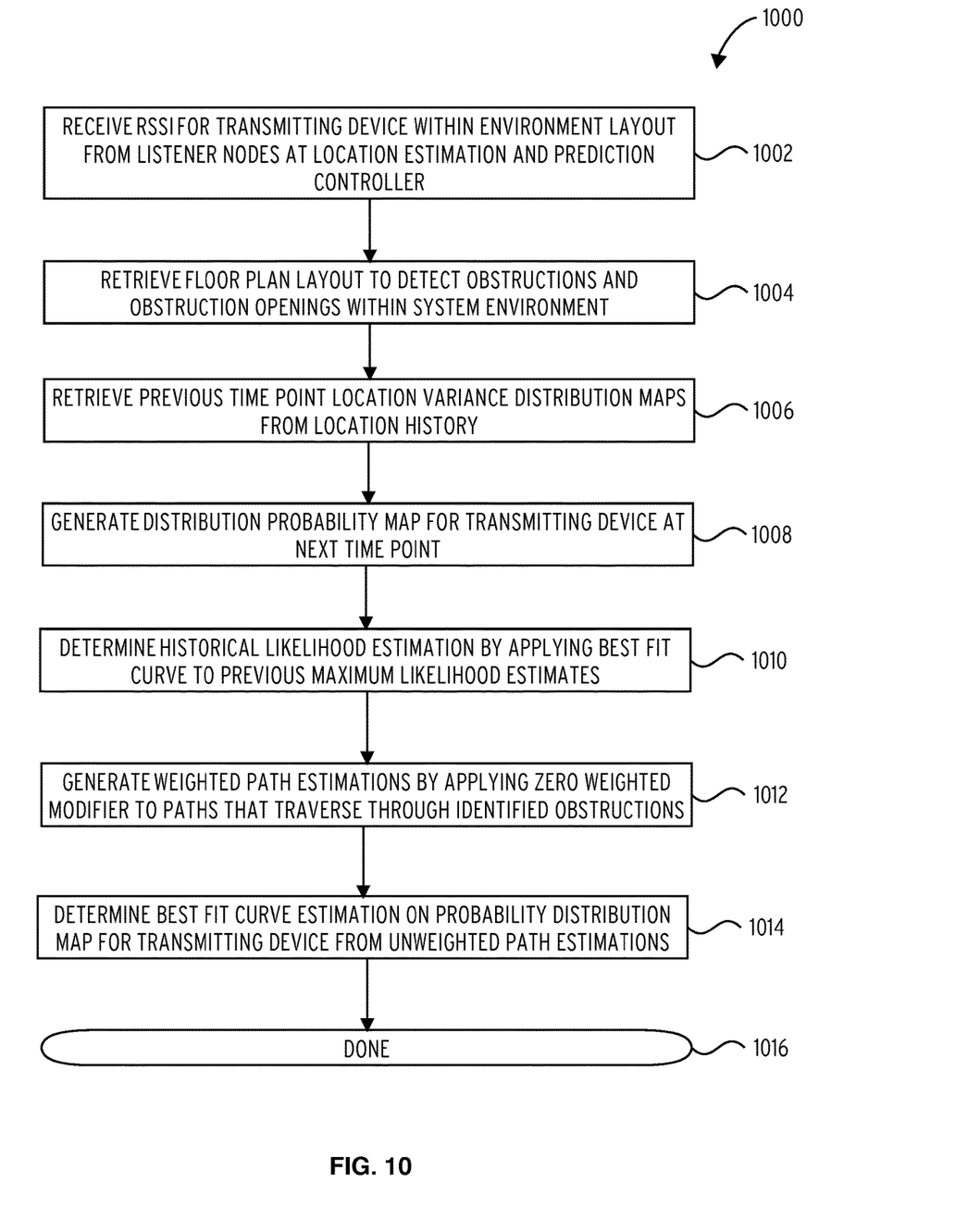
FIG. 10 illustrates an embodiment of a method 1000 of estimating path to predict location.

The system environment 500 may be operated in accordance with the process described in FIG. 8 and FIG. 10.

Figure 6:
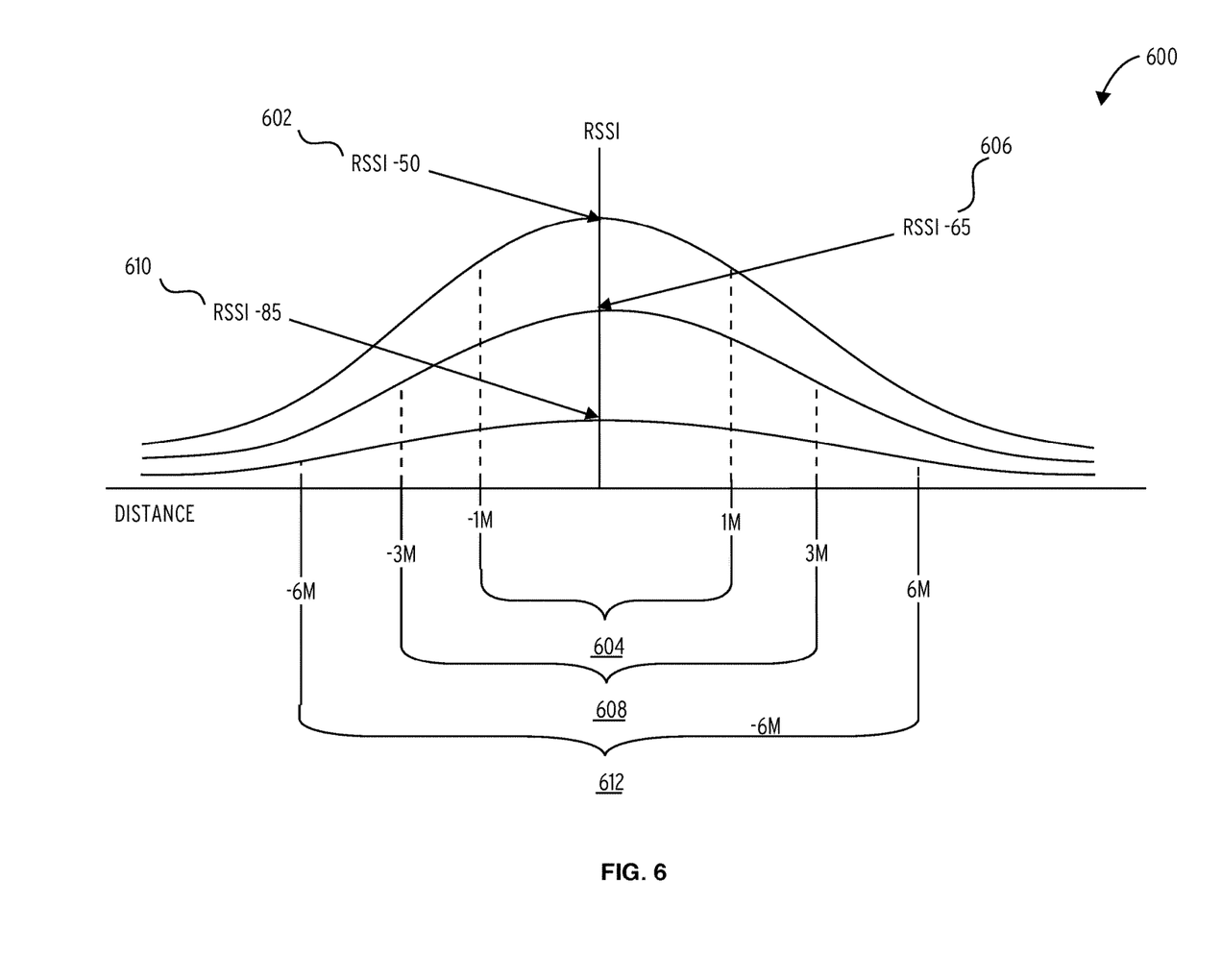
FIG. 6 illustrates an embodiment of a distance variance to relative signal strength indicator (RSSI) distribution graph 600.

Referencing FIG. 6, the distance variance to relative signal strength indicator (RSSI) distribution graph 600 comprises a distribution curve for a first node listener RSSI 602 of −50 with a distance variance 604 of ±1 meter; a distribution curve for a second node listener RSSI 606 of −65 with a distance variance 608 of ±3 meters; and a distribution curve for a third node listener RSSI 610 of −85 with a distance variance 612 of ±6 meters.

The distance variance to relative signal strength indicator (RSSI) distribution graph 600 may be operated in accordance with the process described in FIG. 8 and FIG. 10.

Figure 7:
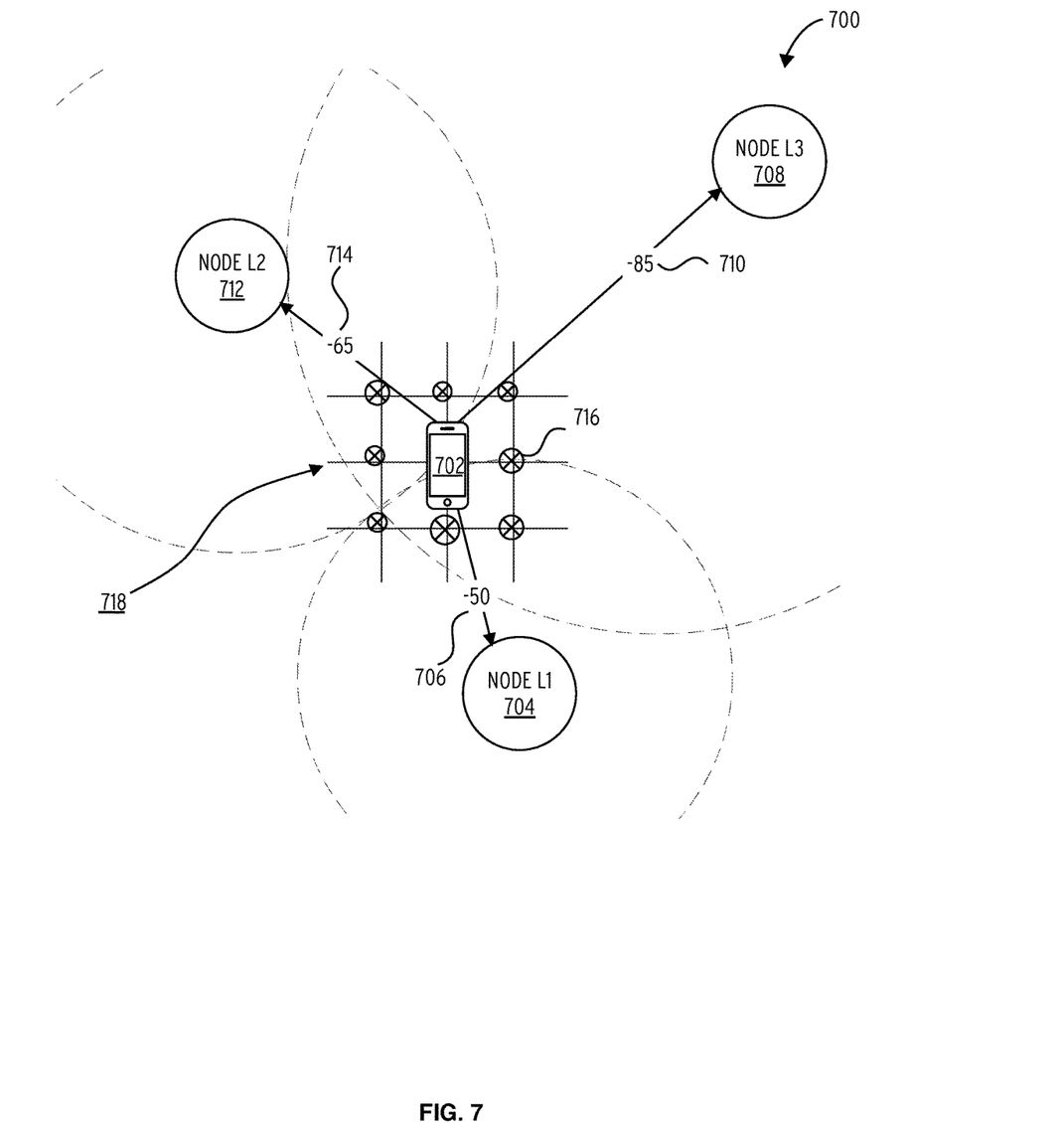
FIG. 7 illustrates an embodiment of a system for generating a probability map 700.

Referencing FIG. 7, the system for generating a probability map 700 comprises a transmitting device 702 detected the first node listener 704, a second node listener 712, and a third node listener 708. The first node listener 704 detects an RSSI 706 of −50 for the transmitting device 702. The second node listener 712, detects an RSSI 714 of −65 for the transmitting device 702. The third node listener 708 detects an RSSI 710 of −85 for the transmitting device 702. Utilizing the distance variance 604 for the RSSI 706, the distance variance 608 for the RSSI 714, and the distance variance 612 for the RSSI 710, a probability map may be generated as a location variance distribution map 718 comprising location probability estimates 716 for the position of the transmitting device 702. A maximum likelihood estimation may be identified within the location probability estimates 716 of the location variance distribution map 718 indicating the position of the transmitting device The system for generating a probability map 700 may be operated in accordance with the process described in FIG. 8 and FIG. 10.

Referencing FIG. 8, a process 800 for estimating location of a transmitting device detects a transmitting device in presence of listener nodes (block 802). In block 804, process 800 collects a relative signal strength indicators (RSSI) for the transmitting device from each of the listener nodes. In block 806, process 800 operates location estimation logic. In subroutine block 808, the location estimation logic determines a probability distribution for distance of the transmitting device from the listener nodes through utilization of a statistical model on the distance variance of the RSSI. In subroutine block 810, the location estimation logic combines the probability distribution for each of the listener nodes. In subroutine block 812, the location estimation logic generates a location variance distribution map for the transmitting device. In subroutine block 814, the location estimation logic identifies a maximum likelihood estimation for the transmitting device from the location probability estimates in the location variance distribution map. In done block 816, process 800 ends.

Figure 9:
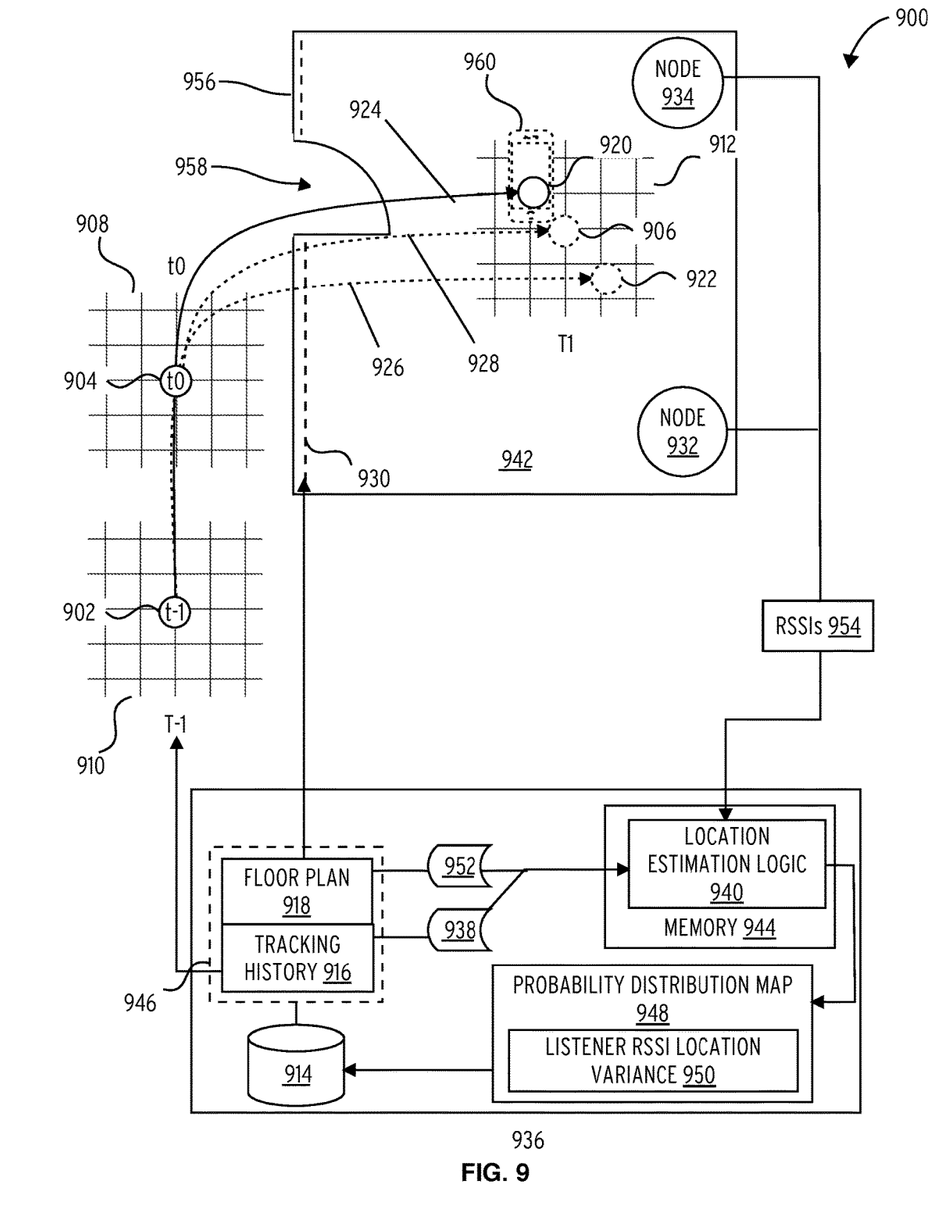
FIG. 9 illustrates an embodiment of a system environment 900 for operating a system for location estimation and prediction in a mesh network.

Referencing FIG. 9, a system environment 900 comprises an environment layout 942 and location estimation and prediction controller 936. The environment layout 942 comprises listener node 934, listener node 932, a transmitting device 960, an obstruction 956, and obstruction opening 958. The listener node 934 and the listener node 932 detect the transmitting device 960 and communicates the RSSIs 954 to the location estimation and prediction controller 936.

The location estimation and prediction controller 936 comprises memory 944 and controlled memory data structure 914. The memory 944 comprises location estimation logic 940. The location estimation logic 940 receives the RSSIs 954 from the listener node 934 and the listener node 932 to generate a probability distribution map 948 comprising listener RSSI location variance 950 for the transmitting device 960. At time point t0 the probability distribution map 948 is an initial time point location variance distribution map 908 comprising a maximum likelihood estimation 904 for the transmitting device 960.

The controlled memory data structure 914 receives and stores the probability distribution map 948 in the tracking history 916. The tracking history 916 identifies previous time point location variance distribution map 910 comprising a previous maximum likelihood estimation 902 at time point t−1.

The location estimation logic 940 utilizes applies a floor plan 918 stored in the controlled memory data structure 914 for the environment layout 942 to determine identified path obstructions 930 and apply a zero weighted modifier 952.

The location estimation logic 940 utilizes previous probability distribution maps 938 from the tracking history 916 and the zero weighted modifier 952 from the floor plan 918 to generate a next time point probability distribution map 912 for time point t1.

The location estimation logic 940 utilizes the RSSIs 954 to determine a path estimation 928 and a maximum likelihood estimation 906 for the transmitting device 960 at the next time point probability distribution map 912.

The location estimation logic 940 determines a historical weighted path estimation 926 from the previous probability distribution maps 938 identifying a historical best fit curve estimation 922 for the location of the transmitting device 960.

The location estimation logic 940 applies the zero weighted modifier 952 to the path estimation 928 and the historical weighted path estimation 926 as they traverse an identified path obstructions 930 to determine an unweighted path estimation 924 identifying a best fit curve estimation 920 on the probability distribution map for the transmitting device 960.

Referencing FIG. 10, a method 1000 of estimating path to predict location receives RSSIs for a transmitting device within an environment layout from listener nodes at the location estimation and prediction controller (block 1002). In block 1004, the method 1000 retrieves a floor plan layout to detect obstructions and obstruction openings within the system environment. In block 1006, the method 1000 retrieves previous time point location variance distribution maps from the location history. In block 1008, the method 1000 generate a distribution probability map for the transmitting device at the next time point. In block 1010, the method 1000 determines a historical likelihood estimation by applying a best fit curve to the previous maximum likelihood estimates. In block 1012, the method 1000 generates weighted path estimations by applying a zero weighted modifier to paths that traverse through identified obstructions. In block 1014, the method 1000 determines a best fit curve estimation on the probability distribution map for the transmitting device from unweighted path estimations. In done block 1016, the method 1000 ends.

Figure 11:
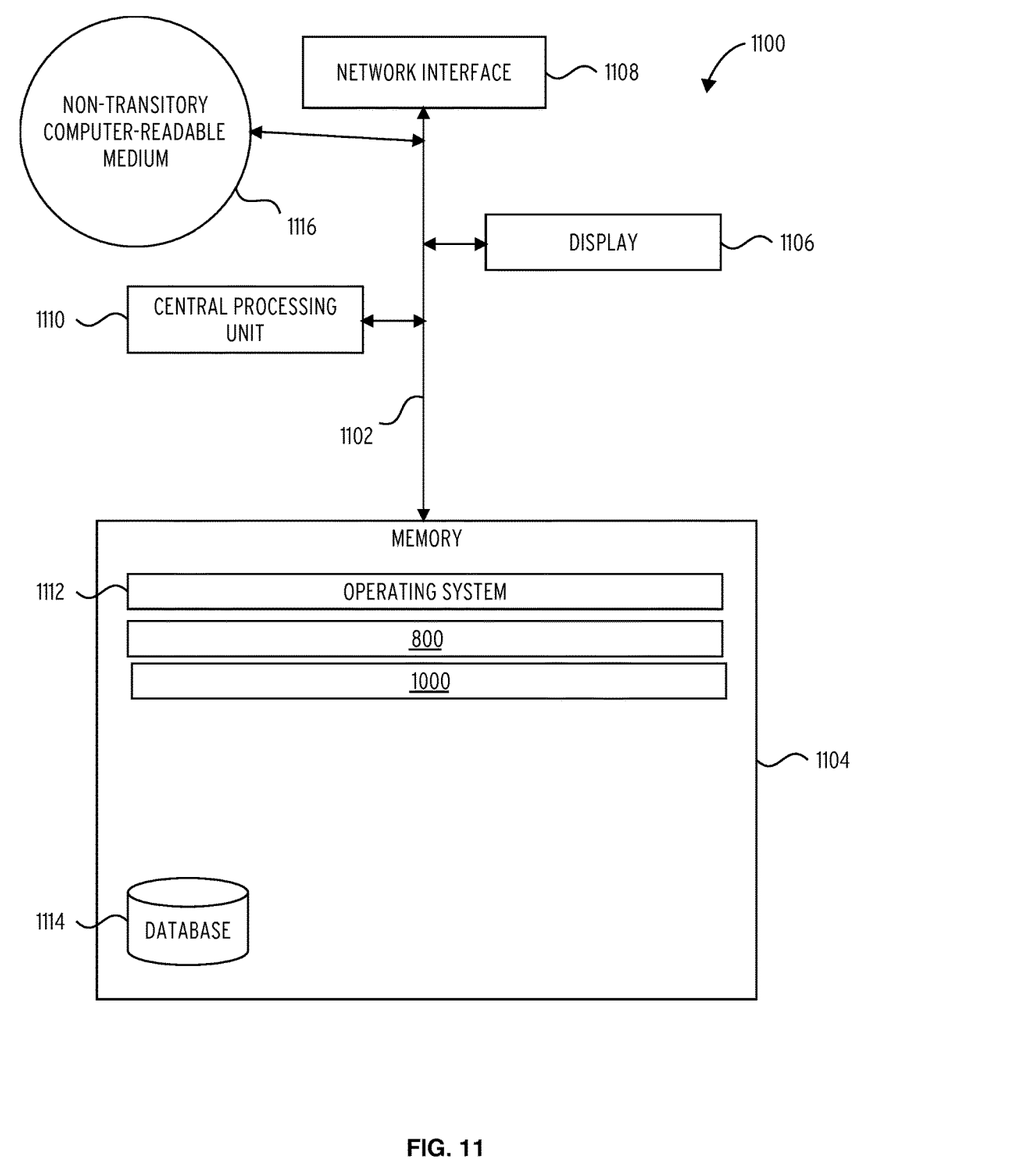
FIG. 11 illustrates a system 1100 in accordance with one embodiment.

FIG. 11 illustrates several components of an exemplary system 1100 in accordance with one embodiment. In various embodiments, system 1100 may include a desktop PC, server, workstation, mobile phone, laptop, tablet, set-top box, appliance, or other computing device that is capable of performing operations such as those described herein. In some embodiments, system 1100 may include many more components than those shown in FIG. 11. However, it is not necessary that all of these generally conventional components be shown in order to disclose an illustrative embodiment. Collectively, the various tangible components or a subset of the tangible components may be referred to herein as "logic" configured or adapted in a particular way, for example as logic configured or adapted with particular software or firmware.

In various embodiments, system 1100 may comprise one or more physical and/or logical devices that collectively provide the functionalities described herein. In some embodiments, system 1100 may comprise one or more replicated and/or distributed physical or logical devices.

In some embodiments, system 1100 may comprise one or more computing resources provisioned from a "cloud computing" provider, for example, Amazon Elastic Compute Cloud ("Amazon EC2"), provided by Amazon.com, Inc. of Seattle, Wash.; Sun Cloud Compute Utility, provided by Sun Microsystems, Inc. of Santa Clara, Calif.; Windows Azure, provided by Microsoft Corporation of Redmond, Wash., and the like.

System 1100 includes a bus 1102 interconnecting several components including a network interface 1108, a display 1106, a central processing unit 1110, and a memory 1104.

Memory 1104 generally comprises a random access memory ("RAM") and permanent non-transitory mass storage device, such as a hard disk drive or solid-state drive. Memory 1104 stores an operating system 1112. The memory 1104 may store a process 800 and a method 1000.

These and other software components may be loaded into memory 1104 of system 1100 using a drive mechanism (not shown) associated with a non-transitory computer-readable medium 1116, such as a floppy disc, tape, DVD/CD-ROM drive, memory card, or the like.

Memory 1104 also includes database 1114. In some embodiments, system 1100 may communicate with database 1114 via network interface 1108, a storage area network ("SAN"), a high-speed serial bus, and/or via the other suitable communication technology.

In some embodiments, database 1114 may comprise one or more storage resources provisioned from a "cloud storage" provider, for example, Amazon Simple Storage Service ("Amazon S3"), provided by Amazon.com, Inc. of Seattle, Wash., Google Cloud Storage, provided by Google, Inc. of Mountain View, Calif., and the like.

Figure 12:
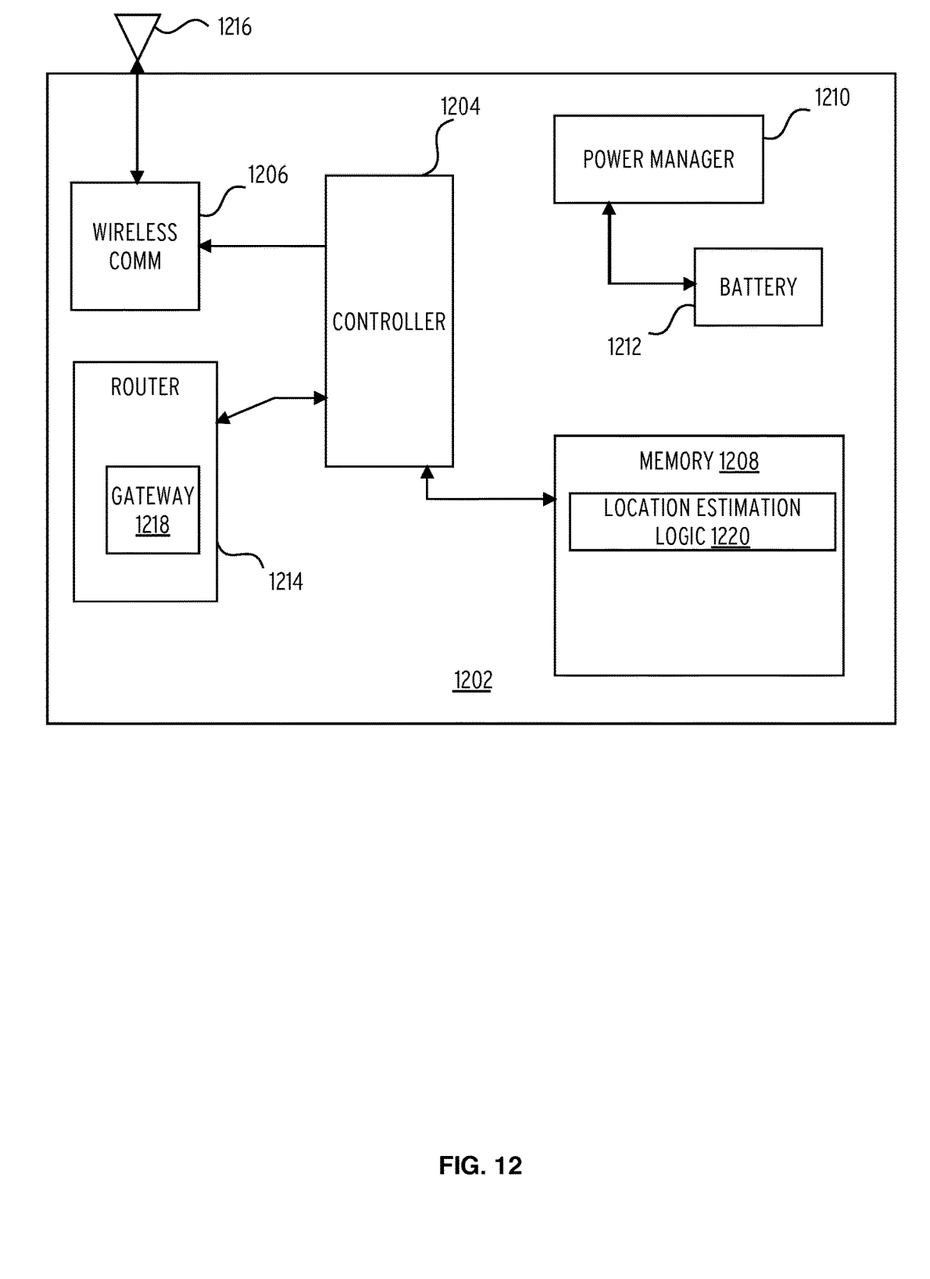
FIG. 12 illustrates an embodiment of a location estimation and prediction controller 1202.

Referring to FIG. 12, a location estimation and prediction controller 1202 includes an antenna 1216, a signal processing and system control 1204, a wireless communication 1206, a memory 1208, a power manager 1210, a battery 1212, a router 1214, a location estimation and prediction controller 1202, and a gateway 1218.

The signal processing and system control 1204 controls and coordinates the operation of other components as well as providing signal processing for the location estimation and prediction controller 1202. For example the signal processing and system control 1204 may extract baseband signals from radio frequency signals received from the wireless communication 1206 logic, and process baseband signals up to radio frequency signals for communications transmitted to the wireless communication 1206 logic. The signal processing and system control 1204 may comprise a central processing unit, digital signal processor, one or more controllers, or combinations of these components.

The wireless communication 1206 includes memory 1208 which may be utilized by the signal processing and system control 1204 to read and write instructions (commands) and data (operands for the instructions). The memory 1208 may include location estimation logic 1220.

The router 1214 performs communication routing to and from other nodes of a mesh network (e.g., wireless mobile mesh network 100) in which the location estimation and prediction controller 1202 is utilized. The router 1214 may optionally also implement a network gateway 1218.

The components of the location estimation and prediction controller 1202 may operate on power received from a battery 1212. The battery 1212 capability and energy supply may be managed by a power manager 1210.

The location estimation and prediction controller 1202 may transmit wireless signals of various types and range (e.g., cellular, WiFi, BlueTooth, and near field communication i.e. NFC). The location estimation and prediction controller 1202 may also receive these types of wireless signals. Wireless signals are transmitted and received using wireless communication 1206 logic coupled to one or more antenna 1216. Other forms of electromagnetic radiation may be used to interact with proximate devices, such as infrared (not illustrated).

Those having skill in the art will appreciate that there are various logic implementations by which processes and/or systems described herein can be effected (e.g., hardware, software, or firmware), and that the preferred vehicle will vary with the context in which the processes are deployed. If an implementer determines that speed and accuracy are paramount, the implementer may opt for a hardware or firmware implementation; alternatively, if flexibility is paramount, the implementer may opt for a solely software implementation; or, yet again alternatively, the implementer may opt for some combination of hardware, software, or firmware. Hence, there are numerous possible implementations by which the processes described herein may be effected, none of which is inherently superior to the other in that any vehicle to be utilized is a choice dependent upon the context in which the implementation will be deployed and the specific concerns (e.g., speed, flexibility, or predictability) of the implementer, any of which may vary. Those skilled in the art will recognize that optical aspects of implementations may involve optically-oriented hardware, software, and or firmware.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

The foregoing detailed description has set forth various embodiments of the devices or processes via the use of block diagrams, flowcharts, or examples. Insofar as such block diagrams, flowcharts, or examples contain one or more functions or operations, it will be understood as notorious by those within the art that each function or operation within such block diagrams, flowcharts, or examples can be implemented, individually or collectively, by a wide range of hardware, software, firmware, or virtually any combination thereof. Portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more processing devices (e.g., as one or more programs running on one or more computer systems), as one or more programs running on one or more processors (e.g., as one or more programs running on one or more microprocessors), as firmware, or as virtually any combination thereof, and that designing the circuitry or writing the code for the software or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, flash drives, SD cards, solid state fixed or removable storage, and computer memory.

In a general sense, those skilled in the art will recognize that the various aspects described herein which can be implemented, individually or collectively, by a wide range of hardware, software, firmware, or any combination thereof can be viewed as being composed of various types of circuitry.

Those skilled in the art will recognize that it is common within the art to describe devices or processes in the fashion set forth herein, and thereafter use standard engineering practices to integrate such described devices or processes into larger systems. At least a portion of the devices or processes described herein can be integrated into a network processing system via a reasonable amount of experimentation. Various embodiments are described herein and presented by way of example and not limitation.

What is claimed is:

1. A method of estimating location of a transmitting device:
   detecting the transmitting device in presence of listener nodes;
   collecting a relative signal strength indicator (RSSI) for the transmitting device from each of the listener nodes;
   operating location estimation logic to determine a probability distribution for distance of the transmitting device from the listener nodes;
   estimating a path to predict location by receiving RSSIs for the transmitting device within an environment layout from the listener nodes at a location estimation and prediction controller;
   generating a distribution probability map for the transmitting device at a next time point;
   generating weighted path estimations by applying a zero weighted modifier to paths that traverse through identified obstructions in a physical space; and
   locating the transmitting device in the physical space by determining a best fit curve estimation on a probability distribution map for the transmitting device from unweighted path estimations.

2. The method of claim 1, wherein the location estimation logic combines the probability distribution for each of the listener nodes.

3. The method of claim 1, wherein the location estimation logic generates a location variance distribution map for the transmitting device.

4. The method of claim 1, wherein the location estimation logic identifies a maximum likelihood estimation for the transmitting device from location probability estimates in a location variance distribution map.

5. The method of claim 1, wherein generating the distribution probability map further comprises determining a historical likelihood estimation by applying a best fit curve to previous maximum likelihood estimates.

6. The method of claim 1, wherein determining the probability distribution for the distance of the transmitting device from the listener nodes is achieved through utilization of a statistical model on the distance variance of the RSSI.

7. The method of claim 1, wherein retrieving a floor plan layout to detect obstructions and obstruction openings within a system environment retrieves previous time point location variance distribution maps from a location history.

8. A computing apparatus, the computing apparatus comprising:
  a processor; and
  a memory storing instructions that, when executed by the processor, configure the apparatus to:
    detect a transmitting device in presence of listener nodes;
    collect a relative signal strength indicator (RSSI) for the transmitting device from each of the listener nodes;
    operate location estimation logic to determine a probability distribution for distance of the transmitting device from the listener nodes;
    estimate a path to predict location by receiving RSSIs for the transmitting device within an environment from the listener nodes at a location estimation and prediction controller;
    generate a distribution probability map for the transmitting device at a next time point;
    generate weighted path estimations by applying a zero weighted modifier to paths that traverse through identified obstructions in the environment; and
    locate the device in the environment by determining a best fit curve estimation on a probability distribution map for the transmitting device from unweighted path estimations.

9. The computing apparatus of claim 8, wherein the location estimation logic combines the probability distribution for each of the listener nodes.

10. The computing apparatus of claim 8, wherein the location estimation logic generates a location variance distribution map for the transmitting device.

11. The computing apparatus of claim 8, wherein the location estimation logic identifies a maximum likelihood estimation for the transmitting device from location probability estimates in a location variance distribution map.

12. The computing apparatus of claim 8, wherein generating the distribution probability map further comprises determine a historical likelihood estimation by applying a best fit curve to previous maximum likelihood estimates.

13. The computing apparatus of claim 8, wherein determining the probability distribution for the distance of the transmitting device from the listener nodes is achieved through utilization of a statistical model on the distance variance of the RSSI.

14. The computing apparatus of claim 8, wherein retrieving a floor plan layout to detect obstructions and obstruction openings within a system environment retrieves previous time point location variance distribution maps from a location history.

* * * * *